Aug. 17, 1965   M. R. HUTCHISON, JR   3,200,722
APPARATUS FOR MAKING FLASH EXPOSURES
Filed June 22, 1962

MILLER R. HUTCHISON
INVENTOR.

BY *R. Frank Smith*

*Karl T. Haramoy*
ATTORNEYS

# United States Patent Office 3,200,722
Patented Aug. 17, 1965

3,200,722
APPARATUS FOR MAKING FLASH EXPOSURES
Miller R. Hutchison, Jr., Rochester, N.Y., assignor to Eastman Kodak Company, Rochester, N.Y., a corporation of New Jersey
Filed June 22, 1962, Ser. No. 204,436
5 Claims. (Cl. 95—11.5)

The present invention relates to photographic cameras and more specifically to camera synchronization of film exposure and photoflash illumination.

The modern flashlamp requires a filament current of approximately one ampere for consistent peaking performance. Depending upon the type of lamp, maximum illumination intensity occurs 15 or 20 milliseconds after such current is established. A weaker current prolongs the interval and may cause misfiring.

In a camera, it is usual to employ a pair of penlite dry cells to provide 3 volts potential in a series circuit including a shutter-operated flash switch of the normally-open type and a lamp socket adapted to receive the flashlamp. To minimize circuit resistance, the flash switch includes wiping contacts under pressure, an arrangement characterized by frictional resistance to operation of the shutter. In the operation of such a switch, it is usual for the friction to vary from time to time and with it, the electrical resistance of the contacts.

Present cameras employing cover blind shutters fit the opening blade with a powerful spring so that it may overcome the variable frictional resistance of the flash switch with minimum disturbance of normal exposure timing. Despite this, the element of uncertainty is not eliminated. A further objection to such an arrangement is that a multibladed shutter lacks the simplicity and low cost of the single-blade type shutter which was common before photoflash lamps were introduced; and the greater force needed to operate them often requires resort to a set type shutter wherein a shutter-cocking mechanism is used and is driven by the film transport system or other means instead of permitting the use of an automatic type shutter which is set and released by the trigger button directly.

Thus, the conventional arrangement upon which flash synchronization depends in present day cameras inherently suffers from variability in the timing of the illumination and the opening of the shutter and is characterized by mechanical complexity and objectionable cost.

Accordingly, a primary object of the present invention is to synchronize a flashlamp with the operation of a camera shutter by simple means which in no way influences the movement of the blade or blades of the shutter during the exposure movement thereof; a more specific object of the invention being to so synchronize the flashlamp with the shutter by means whereby the ignition of the lamp is initiated by opening rather than closing a switch in the lamp circuit. Another object of the invention is to simplify such flash synchronizing means by utilizing existing shutter components as elements of the flash initiating means. Yet another object of the invention is to incorporate in shutter systems employing such synchronizing systems, means for adjusting the time delay between the initiation of the flash and the opening of the shutter to facilitate the initial assembly of the device, and, if desired, to allow the synchronizing means to be selectively adjusted for use with different types of lamps having different delay characteristics. A further object of the invention is, by means of such a system, to simplify and at the same time improve the operation of flash synchronized shutters. These and other important objects of the invention will be apparent from the following description, reference being made to the accompanying drawing in which:

Figure 1:
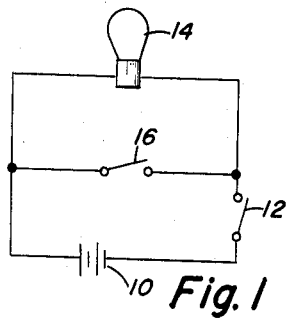
FIG. 1 is a diagram of the basic circuit of a flash synchronization device according to a preferred embodiment of the invention.

Referring now to the drawings, FIG. 1 shows the flash synchronization circuit of the present invention which comprises a series circuit including a battery 10, a switch 12 and a flashlamp 14, and, in addition, a switch 16 in parallel shunt relation to the lamp. In the illustration, switches 12 and 16 are shown in open position in which no current flows in the circuit. To fire the lamp, shunt switch 16 is first closed, after which series switch 12 is closed. With both switches closed, the low resistance of the shunt as compared with the relatively high resistance of the lamp itself prevents sufficient current from flowing through the lamp to cause it to fire. Upon the opening of shunt switch 16, however, the increase in current carried by the lamp causes it to fire. As soon as the lamp has fired, it is of course no longer conductive and the circuit is broken even though switch 12 may remain closed. Following the firing of the lamp switch 12 is opened prior to installing a fresh lamp.

Figure 2:
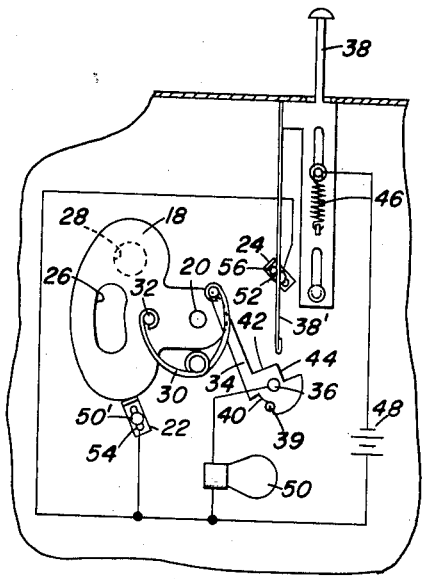
FIG. 2 is a schematic view of a simple "low energy" type shutter incorporating a flash synchronization system according to the present invention.
Figure 3:
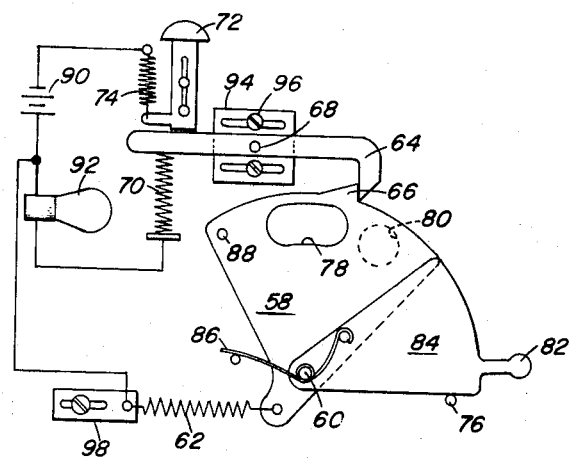
FIG. 3 is a schematic view of another form of shutter incorporating a cover blind and provided with a flash synchronizing system according to the present invention.
Figure 4:
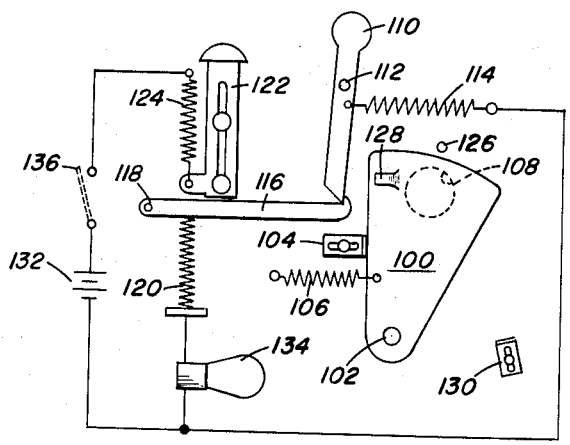
FIG. 4 is a schematic view of still another form of shutter utilizing a rebounding shutter blade in conjunction with the flash synchronizing system of the present invention.

The application of this circuit to synchronize flashlamps with various types of shutters representative of those most commonly employed in cameras is schematically illustrated in FIGS. 2, 3 and 4. It should be understood, of course, that these examples are illustrative only inasmuch as the invention is equally applicable to shutter devices of other types.

FIG. 2 shows the application of the present invention to a very simple type of low energy shutter comprising a shutter blade 18 pivotally mounted at 20 for movement between the illustrated position in which the blade is in contact with stop member 22, and a second position in contact with stop member 24, during which movement the elongated opening 26 in the blade uncovers an exposure aperture 28 in alignment with the optical system of a camera. The shutter operating spring 30 is attached at one end to the shutter blade at 32 and at its other end to a rockable member 34 pivoted at 36 and movable between two positions determined by the engagement of a pin 39 with the ends of notch 40. When member 34 is in either of its extreme positions spring 30 holds the blade against one or the other of stop members 22 or 24. As the rockable member is moved, the spring is tensioned and the blade continues to be urged against the stop until the end of the spring attached to member 34 crosses the line defined by points 20 and 32, at which time the blade snaps into contact with the other stop member. To alternately move member 34 between its extreme positions to effect repeated operation of the shutter in response to successive actuations of a trigger member 38, this member is slidably mounted as shown and is provided with a flexible arm 38', the lower end of which is adapted to engage one of two notches 42 and 44 in the member 34 as the shutter release is depressed against the resistance of spring 46. Due to the relation of the notches to the end of arm 38' and to pivot 36, this arrangement causes the rockable member to alternately be moved from one extreme position to the other by successive actuations of the release member.

In order to incorporate the flash synchronization system of the present invention in the above described shutter, a battery 48 or other source of electrical energy is connected in series with flashlamp 50 between spring 46 and pivot 36 of member 34 with stop members 22 and 24 being connected to the battery side of the lamp. For purposes of simplicity it is assumed in FIGS. 3 and 4, that all of the various shutter components are conductive but are mounted on an insulating member. In the condition shown in FIG. 2, it is obvious that no current can flow because of the open circuit between arm 38′ and member 34. As trigger 38 is depressed, however, arm 38′ contacts member 34 to close the battery circuit but the bulb is protected against ignition by the shunt created through stop 22, blade 18, spring 30 and member 34. As soon as trigger 38 has been sufficiently depressed to cause the shutter blade to start to move, however, the shunt is broken between blade 18 and stop 22, thereby causing the lamp to fire. Analogizing this circuit to FIG. 1, battery switch 12 comprises the contacting portions of arm 38′ and member 34 while shunt switch 16 is formed by the cooperation of blade 18 with either of the stops 22 or 24. In order to adjust the delay between the opening of the shunt and the opening of the shutter, stops 22 and 24 are adjustably mounted by means of screws 50′ and 52 passing through respective slots 54 and 56, whereby the stops may be moved to alter the distance through which the shutter blade must move prior to uncovering aperture 28. While such an adjustment slightly alters the shutter speed, this change is generally not significant enough to require compensation in inexpensive shutters of this type.

FIG. 3 schematically depicts a second basic type of shutter in which a shutter blade is cocked against the influence of a spring and is released to effect an exposure. In the illustrated embodiment, the shutter comprises a blade 58 pivotally mounted at 60 and releasably latched in the illustrated position against the influence of spring 62 by the engagement of a latch member 64 with an ear 66 on the shutter blade. Latch member 64 is pivotally mounted at 68 and is maintained in engagement with ear 66 by a light compression spring 70. To release the shutter, the slidably mounted trigger member 72 is depressed against the resistance of spring 74 and engages the end of latch member 64. Further depression of member 72 rocks member 64 about pivot 68 against the resistance of spring 70 to disengage the latch from ear 66, whereupon blade 58 is rotated in a clockwise direction into engagement with a stop pin 76 by spring 62. During this movement, an elongated aperture 78 in the shutter blade momentarily uncovers the camera exposure aperture 80. With the trigger member returned to its initial position by spring 74, the shutter is reset by means of a lever 82 attached to a cover blind 84, which is likewise pivoted at 60 and urged in a clockwise direction against pin 76 by a light spring 86. As the cover blind is moved in a counter clockwise direction, aperture 78 is first obscured and pin 88 on the shutter blade is engaged thereby. The continued movement of lever 82 returns blade 58 to the illustrated position in which it is latched by member 64, after which the lever is released and the shutter blind is returned to its initial position by spring 86. To incorporate the flash synchronization system of the present invention in this shutter, the battery and bulb are connected in series to springs 70 and 74, whereby the battery switch designated by 12 in FIG. 1 comprises trigger member 72 and latch member 64. The shunt is connected between spring 62 and the conductor between lamp 92 and the battery 90 and is broken by the disengagement of member 64 and ear 66 as represented by switch 16 in FIG. 1. In order to vary the flash delay in this embodiment the pivot 68 of latch member 64 may be adjustably mounted, as for example on a movable plate 94 lockable in various positions by screws 96. To compensate for variation in shutter speed caused by the adjustment of pivot 68, the tension of the shutter spring 62 might also be adjustable, for example by means of a slidable and lockable member 98, to which the end of the spring is attached.

The device schematically shown in FIG. 4 represents still another basic type of shutter in which the shutter blade moves in one direction to uncover the exposure aperture and then returns to its original position to terminate the exposure. It should be understood, of course, that while FIGS. 3 and 4 illustrate single bladed embodiments of different types of shutters, the same types of construction are also employed in more elaborate multi-blade shutters. The shutter illustrated in FIG. 4 comprises a shutter blade 100 pivoted at 102 and resiliently urged in a counter clockwise direction against an adjustable stop 104 by a spring 106, in which position the camera exposure aperture 108 is covered by the blade. A shutter driving member 110 is pivotally mounted at 112 and is retained in the illustrated cocked position against the influence of spring 114 by a latch member 116 pivoted at 118 and resiliently held in latching engagement with driving member 110 by a compression spring 120. When the slidably mounted trigger member 122 is depressed against the resistance of spring 124, it contacts latch member 116, pivoting the latch out of engagement with shutter driver 110, thereby allowing the shutter driver to be moved in a counter clockwise direction by spring 114 and into engagement with a stop pin 126. As the shutter driver so moves, the end thereof engages the adjacent end of a sloped ear 128 on blade 100. Since spring 114 is stronger than spring 106, the shutter is moved by the driver in a clockwise direction to uncover the camera exposure aperture 108. Prior to completing its movement, driver 110 swings out of engagement with ear 128, having first, however, imparted sufficient inertia to the blade to momentarily overcome the tension of spring 106. Upon striking rebound member 130, however, the blade loses its clockwise inertia and is returned to the illustrated position by spring 106 without engaging driver 110, which is now in contact with pin 126 out of the path of ear 128. To recock the shutter after member 122 has been released, lever 110 is moved in a clockwise position and cams over ear 128 and into latched engagement with member 116.

In incorporating the flash synchronization system of the present invention in this shutter, the battery and lamp may be connected in series between springs 120 and 124, with trigger member 122 and latch member 116 comprising the battery switch shown at 12 in FIG. 1, while spring 114 may be connected to the conductor between the battery 132 and lamp 134, thus providing a shunt switch as shown at 16 in FIG. 1 through the cooperation of driver 110 and latch member 116. The time delay of the shutter may be regulated by adjusting the position of the movable and lockable stop member 104, the speed of the shutter being variable by means of the adjustable rebound member 130.

Although the flash device of the present invention uses somewhat more current than conventional devices comprising an open switch in series with a battery and a lamp, because of the instantaneous shorting of the battery with each operation of the shutter, this factor has proven for all practical purposes to be completely inconsequential. For example, in testing such a device, I have found that more than a thousand AG-1 type flashlamps may be fired without exhausting two standard "pen-lite" type batteries. Furthermore, the momentary short circuiting is of such short duration as to have no apparent damaging effect on the batteries. Although I have found such a feature to be unnecessary for all practical purposes, a switch might be installed in series with the power source as shown at 136 of FIG. 4 to prevent any flow of current when the shutter is operated without the use of a flashlamp. For automatic operation, such a switch could be closed by the insertion of a lamp in its socket, by the opening of a retractable reflector, etc.

The slight arcing at switch 16 when the shunt is broken has also proven to be not objectional for most applications but could be minimized if desired by an appropriate capacitor across switch 16 in parallel with a relatively high resistance to allow the capacitor to discharge between successive operations of the shutter.

In additon to the conventonal flashlamp which contains a filament which is heated by the application of an electric current to ignite combustible materials within a transparent envelope there are other known sources of flash illumination which have been or are used in photography. Some of these consist of combustible materials adapted to be ignited by sparks generated both mechanically and electrically, flood lamps which are adapted to be momentarily overvolted, etc. Throughout the present specification and the claims the term "conventional flashlamp" or "flashlamp" is meant to connote a glass envelope containing a filament which is heated by the application of an electric current to ignite combustible materials within the envelope, and in which flashlamp there is a delay between the time the firing current is passed through the filament and the time the lamp reaches its peak of illumination.

Since various modifications may be made without departing from the spirit of the invention, the foregoing description is to be considered as illustrative only, the scope of the invention being defined by the following claims.

I claim:

1. A device for synchronizing the firing of a flashlamp with a shutter mechanism comprising:
    (a) a shutter blade initially disposed in a first position and movable to a second position,
    (b) shutter operating means for initiating, upon the actuation thereof, the movement of said blade to said second position, and
    (c) a trigger element movable along a path in which said shutter operating means is first engaged and then actuated thereby, said device comprising in combination:
        (1) socket means for receiving a flashlamp,
        (2) voltage supply terminals for electrical connection to a source of voltage,
        (3) first conductive elements electrically connecting said socket means and said voltage supply terminals in a normally open series circuit, and including means for closing said series circuit in response to the engagement of said trigger element with said shutter operating means, and,
        (4) second conductive elements establishing a normally closed electrical shunt circuit across said socket means, and including means for opening said shunt circuit in response to the actuation of said shutter operating means.

2. A construction according to claim 1 including means for adjusting the timed relation between the actuation of said shutter operating means and the opening of said shunt circuit.

3. A camera shutter mechanism including flashlamp synchronizing means comprising:
    (a) an electrically conductive shutter blade initially disposed in a first position and movable to a second position,
    (b) an electrically conductive member adapted to be engaged by said blade in said first position,
    (c) electrically conductive shutter operating means in electrical connection with said blade for initiating, upon the actuation thereof, the movement of said blade to said second position,
    (d) an electrically conductive trigger element initially spaced from said shutter operating means and movable along a path in which said shutter operating means is first engaged and then actuated thereby,
    (e) socket means for receiving a flashlamp,
    (f) voltage supply terminals for connection with a source of voltage,
    (g) means for electrically incorporating said socket means and said terminals in a series circuit established through said trigger element and said shutter operating means when engaged thereby, and
    (h) means for establishing a shunt circuit across said socket means through said blade and said member when engaged thereby.

4. A camera shutter mechanism including flashlamp synchronizing means comprising:
    (a) a shutter blade initially disposed in a closed position and movable to an open position,
    (b) an electrically conductive shutter operating member movable from a first position to a second position to move said blade from said closed position to said open position,
    (c) resilient means for biasing said shutter operating member toward said second position,
    (d) an electrically conductive intermediate member for releasably latching said shutter operating member in said first position and for releasing said shutter operating member for movement to said second position upon the actuation of said intermediate member,
    (e) an electrically conductive trigger element initially spaced from said intermediate element and movable along a path in which said intermediate element is first engaged and then actuated thereby,
    (f) socket means for receiving a flashlamp,
    (g) voltage supply terminals for electrical connection with a source of voltage,
    (h) means for electrically connecting said socket means and said terminals in a series circuit established through said trigger element and said intermediate member when engaged thereby, and
    (i) means for electrically establishing a shunt circuit across said socket means through said intermediate member and said shutter operating member when latched thereby.

5. A device for synchronizing the firing of a flashlamp and the actuation of a shutter so that the shutter is open when the flashlamp is illuminated with maximum intensity comprising, means for actuating the shutter, a voltage source, a socket for a flashlamp in series circuit connection with the voltage source, a first switch in said series circuit, said first switch including the shutter actuating means and being normally open, a shunt circuit across said socket, a second switch in said shunt circuit operatively connected with said shutter actuating means, said second switch being normally closed and being opened by the shutter actuation means and means for adjusting the time delay between opening of said second switch and the opening of the shutter.

References Cited by the Examiner

UNITED STATES PATENTS 2,071,370    2/37    Williams _____ 95—11.5
2,214,317    9/40    Bash _____ 240—25

NORTON ANSHER, *Primary Examiner.*
JOHN M. HORAN, *Examiner.*